Aug. 11, 1959 H. K. VONHOF 2,899,502

COMBINED TELEPHONE AND PUBLIC ADDRESS SYSTEM

Filed Jan. 27, 1956

INVENTOR
HEINZ K. VONHOF

United States Patent Office 2,899,502

Patented Aug. 11, 1959

2,899,502

COMBINED TELEPHONE AND PUBLIC ADDRESS SYSTEM

Heinz K. Vonhof, Berlin-Charlottenburg, Germany

Application January 27, 1956, Serial No. 561,885

4 Claims. (Cl. 179—18)

Figures 1, 2:
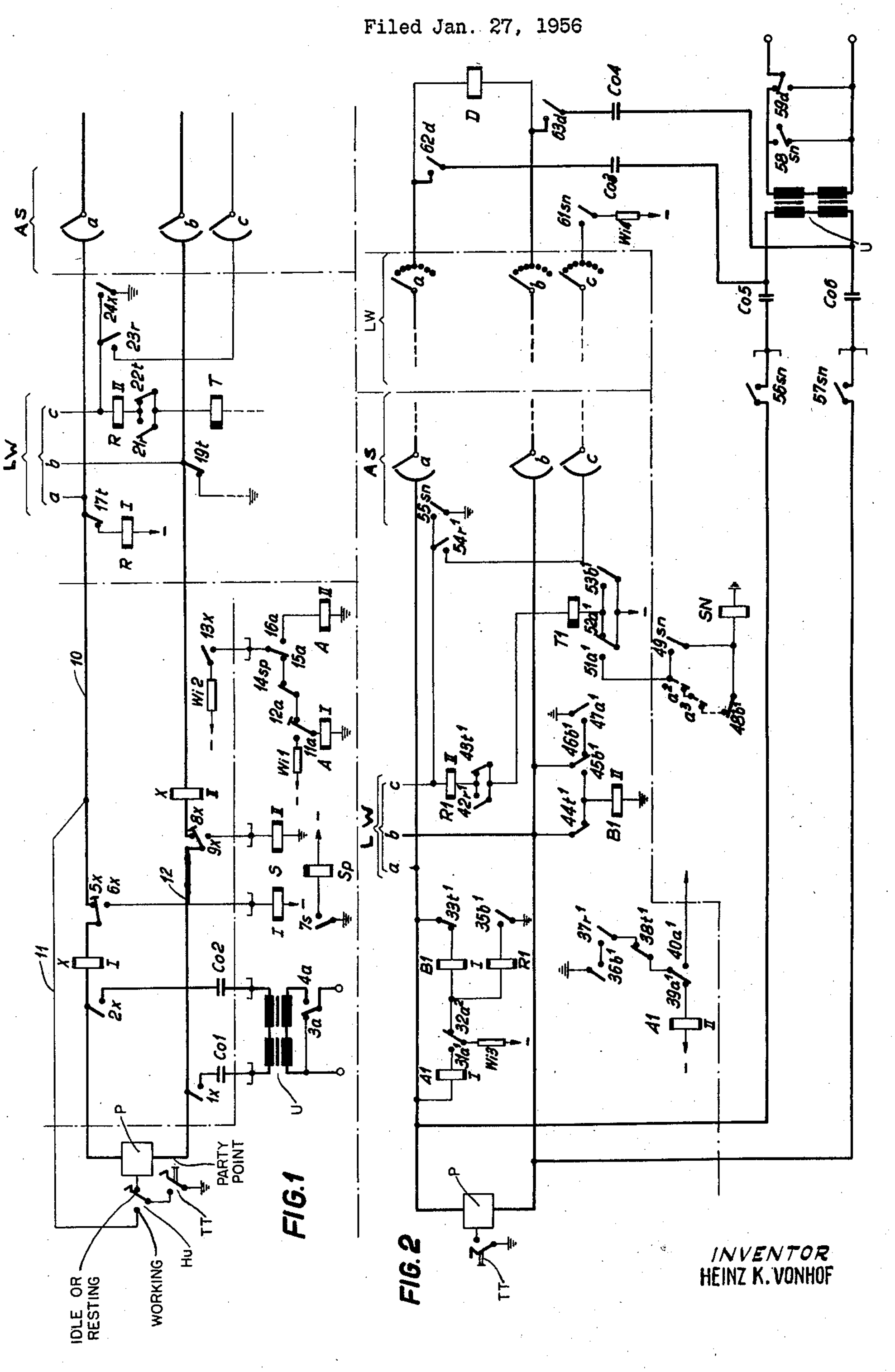

The present invention relates to a combined telephone and public address system, and is particularly adapted for use in small private telephone installations, as in offices and factories. The system of the invention combines a selectively operated loud speaker assembly in combination with a telephone installation, whereby a caller can quickly get in touch with the person looked for, at the same time to a great extent avoiding the utilization of the existing connection apparatus for normal telephone traffic.

Sometimes a person at a distance from a central station is called by means of loud speakers set up at various locations in the plant or office through a definite individual signal or even by name. The person sought can then call the calling station from any connecting line over the normal telephone connecting system, or, alternatively, he can be connected directly with the calling individual by giving a signal, thus clearing the connecting apparatus. The carrying out of the search process, that is, transmitting the individual signal or calling the name, must take place at a station especially provided for that purpose. The searching party must therefore first of all get in touch with that particular station or point.

The combined telephone and public address system of the present invention, which is advantageously applicable particularly in smaller plants and offices, has for its purpose the elimination of the participation of other stations or positions in the search process and the reduction of use of necessary auxiliary means to afford the searching party the opportunity to call the desired party or parties with the aid of a loud speaker arrangement. The system of the invention is so constructed that after the personal call signal is given over the telephone or transmission line, a loud speaker arrangement assigned to the plant or office is connected to the calling station which transmitted the signal. The system of the invention is further so constructed that after the person sought or called has given an answering signal, the loud speaker arrangement is disconnected from the telephone transmission line and the called station is connected with the calling or searching station.

It is among the objects of the present invention to provide a combined telephone and public address system having a plurality of stations whereby one or more of the stations may selectively and alternatively be connected by manipulations at a calling station to a called station or to a loud speaker assembly.

A further object of the invention is to provide such combined telephone and public address system wherein, once a calling station has been connected to the loud speaker assembly, it may be disconnected therefrom and connected to the called station by manipulations at the called station.

The above and further objects of the invention will be more readily apparent upon consideration of the following specification, and of the drawing forming a part of said specification.

In the drawing:

Fig. 1 is a simplified wiring diagram of a first embodiment of the invention, showing a part of a small private telephone installation in which connections between various stations are made over connection assemblies, one such station, its branch line, the connection assembly therefor, and the novel switching arrangement of the invention which is associated with such branch line, being shown.

Fig. 2 is a simplified wiring diagram of a second embodiment of the invention, showing a part of a small private telephone installation in which there is provided a dial-operated selective connection assembly at each station, one such station, its branch line, the dial-operated selecting assembly therefor, and the switching arrangement of the invention which is associated with such branch line, being shown.

In Fig. 1, the combined telephone and public address system of the invention is shown incorporated in a small private telephone installation in which the connections between the various parties in the plant are made over connection assemblies (finder-switches-connectors). Certain authorized persons in the plant have, at their stations of the telephone installation, connection points with a special characteristic, for example a connection point with a ground key. With such ground keys, the customary connecting processes in the extension-station service (local inquiries, intrusions upon busy connection points, etc.), may be started. In the present invention, such ground key is used, in addition, to give the personal code signal and reporting signal above referred to, thereby avoiding the use of the connecting assemblies provided for normal telephone service, but effecting a connection between the calling and called stations. The system includes a loud speaker system, and the telephone transmission line. Specifically each branch circuit thereof, includes switching means for selectively connecting the calling station to the loud speaker system through a portion of the transmission line. Each calling station includes means to operate the switching means in such manner as to selectively connect the calling station to the loud speaker system or to disconnect the calling station from the loud speaker assembly and to connect the former to the telephone transmission line and to the called station. The system of the invention further includes, in the illustrative embodiment shown in Fig. 1, means whereby the calling station is automatically disconnected from the loud speaker system when selectively operable control means at one or more called stations is operated.

In Fig. 1 there is shown by way of example one station of a small private telephone installation, there being shown the branch line for such station, the connection assembly for such branch line to a telephone transmission line, and the novel switching arrangement of the invention which is associated with such branch line. A plurality of similar branch stations (not shown) are provided, such other similar stations being connected to the telephone transmission line in the same manner as in the station shown, each such other branch station being connected to the input or primary side of the same coupling device U as that shown in Fig. 1. The multiple coupling device U has one set of output leads which are selectively connected through contacts *3a*, *4a* to a centrally located loud speaker system (not shown).

Turning now to the system shown in Fig. 1, let us assume that a person at the telephone station shown wishes to be connected with another person at another station. The person at the calling station lifts his receiver from the indicated switch hook HU, without activating or changing the position of the ground key TT at such calling station. The calling circuit or loop is closed in the well-known manner, as follows: ground, contact *19t*, lower speaking wire 12, winding II of relay X, contact 8*x*, party point P, upper speaking wire 10, winding I of relay X, contacts 5*x*, 17*t*, winding I of relay R, negative. The calling relay R of the calling station shown calls on this current circuit and thus causes the setting up of the call finder AS into the branch line of the calling station shown. The relay X is a differential relay having two windings XI and XII interposed in the two speaking wires 10, 12, respectively, of the branch line. Under the circuit condition described above, relay X does not respond, since the two windings thereof oppose each other. Upon actuation of the call finder by the calling party, the test circuit is brought into play over connecting arms *c* of the call finder, proceeding over contact 23*r*, winding II of relay R, contact 22*t*, or contact 21*r* and the winding of relay T. In the test circuit relay, T now responds, which opens contact 22*t*. The test circuit, as well as the excitation of relays R and T, are maintained over contact 21*r*. Contacts 17*t* and 19*t* switch the call potentials off from the wires of the branch line.

The ground key TT, located at party point P, allows the initiation of various processes after the above described connection has been effected. One such process is the intrusion into the circuit of the desired part found to be engaged. The ground connection through the key TT works over the indicated switch hook HU in working position (in upright position contacting wire 11 when the receiver has been received from the hook) and the upper wire 10 of the speaker wire to the switching device of the line selector. The relay X cannot interfere in such operation, since the wire 11 from the ground connection is connected to the upper speaking wire 10 at a point beyond the winding I of relay X.

If the calling party wishes to reach another party, the called party, desired by the calling party but who has not yet responded to a telephone call, over the personnel search system of the invention, the calling party then activates his ground key TT with the receiver-supporting hook switching contact HU in the idle or resting position shown in Fig. 1. This causes the following current circuit for relay X to take place: ground, key TT, hook switching contact HU, upper speaking wire 10, winding I of relay X, contacts 5*x*, 17*t*, winding I of relay R, negative. The current circuit for relay R is maintained for a brief time only as contact 5*x* is opened up directly upon the key pressure. Even during the key pressure the calling party takes off the receiver. The following current circuit then takes place: ground, winding II of relay S, contact 9*x*, lower speaking wire 12, party point P, upper speaking wire 10, winding I of relay X, contact 6*x*, winding I of relay S, negative. In this current circuit relay S responds while relay X continues to be excited or energized. At contacts 1*x* and 2*x*, the party point P is connected to a multiple-coupling device U. Relay X, of which contacts 1*x* and 2*x* are a part, therefore constitutes a means whereby the party point P may selectively alternatively be connected to a loud speaker assembly or to the telephone transmission line.

Contact 24*x* marks the calling party as engaged against incoming connections, relay X operating contact 24*x* to connect test wire *c* to ground. As shown, line *c* is one of the three wires shown at the line selector LW. The described operation of relay X closes contact 13*x*, which sets up a circuit as follows: negative, resistance W*i*2, contacts 13*x*, 15*a*, 14*sp*, 12*a*, winding I of relay A, ground. Relay A responds and is maintained in a holding circuit over contact 11*a* and resistance W*i*I. The opposing winding II of relay A, which is also of the opposed winding differential type, receives current over contact 16*a*, but such additional current, as result of a suitable choice of resistance W*i*2, to cause relay A to drop off. By means of contact 7*s*, the guard relay S*p* is switched in during the duration of the personnel searching process, so that, by means of contact 14*sp*, a renewed switching in of relay A after the dropping off of its contacts is prevented. By opening the contact 3*a* and the closing of contact 4*a* a loud speaker assembly (not shown) including an amplifier are connected with the coupling device U and thus with the calling station point P.

The calling person can now ask the sought for person, over the loud speaker, to report. For this purpose any apparatus provided with a ground key may be used. The person thus reporting may proceed in the same manner as the calling party, that is, by first of all pressing the ground key at his particular station, and then taking the receiver off the hook at such station. This causes a relay, corresponding to the relay X of the station shown, of the second called branch line of the apparatus to be switched in, so that the branch line of the called station is connected with the coupling device U through the closing of contacts in such second called station, corresponding to the contacts 1*x* and 2*x* of the branch station shown. By closing contacts of the second called station corresponding to contacts 6*x* and 9*x* shown, the relay S of the called branch line of the apparatus is switched in. Through a further contact of the second called station, corresponding to contact 13*x*, an additional resistance similar to resistance W*i*2 is placed in parallel with resistance W*i*2 in the current circuit for the winding II of relay A. Through such parallel switching in of the two described resistances, the current in the opposing winding II of relay A increases to such an extent that it is made to drop. The amplifier of the loud speaker assembly is therefore switched off at contact 4*a*, so that the subsequent conversation between the calling party and the called party is no longer carried over the loud speaker but is carried on over the apparatus of a telephone system, including contacts 1*x*, 2*x*, condensers C*o*1, C*o*2, to the branching point, and from the latter over corresponding condensers and contacts of the corresponding relay X (not shown) of the branch station being called. Electric current for feeding such telephone transmission circuit is brought over the windings of relay S. After the telephone conversation has been concluded, and both receivers have been hung up, the relays X and S of both the calling and the called branch lines are caused to drop, and the position of rest of the system is again established.

The combined telephone and public address system shown in Fig. 1 makes it possible for the calling party to call upon several other persons to attend a conference talk, that is, if such several other persons are provided with key-equipped apparatus. By actuating the keys of the several branch stations in the manner described, all of such persons may be placed in speaking contact with each other at the same time over the multiple connections coming from the primary side of the coupling device U.

In Fig. 2 there is shown in somewhat simplified form, one branch station of a small private telephone installation in which there is provided a dial-operated selective connection assembly at each station. The system of Fig. 2 includes switching devices in a holding circuit for the calling station branch line, such switching devices being responsive to the transmission of signal pulsations by the dial-operated selective connection assembly so as to be switched off upon the setting up of a connection between a calling station and a called station through the connection assembly. Thereupon the switching devices transmit a personal call signal to the transmission line, and the switching means, which is responsive to the said personal call, closes the circuit from the calling station branch line to the loud speaker assembly.

Let us assume that the person employing the branch station shown in Fig. 2 wishes to contact another person in the plant or office. The person making the call removes his receiver from the receiver-supporting hook, thereupon establishing the following circuit for the relay B1: negative, resistance W*i*3, contact 32*a*2, winding I of relay B1, contact 33t1, contact 44t1, winding II of relay B1, ground. Through contact 35b1 the winding I of relay R1 is switched in. The following current circuit for relay A1 is then established: ground, contacts 36b1, 37r1, 38t1, 39a1, winding II of relay A1, negative. Relays A1 and B1 then establish the following holding circuit for the calling and called stations: negative, resistance Wi3, contact 31a1, winding I of relay A1, the branch station loop or circuit, contact 45b1, winding II of relay B1, ground. Relay R1 is in series with the windings I of relays B1 and A1, over its winding I. A starting circuit is closed through contact 40a1 through which the call finder AS is made to locate the connection of the calling station.

After such connection of the calling station is located, a test current circuit is established as follows: contacts of the called branch circuit (not shown), switching arms *c* of call finder AS, contact 54r1, winding II of relay R1, contact 42r1 or contact 43t1, winding of relay T1, contact 53b1, negative. In this circuit, the relay T1 is energized and relay R1 is maintained energized. The test circuit remains closed at contact 42r1 in spite of the opening of contact 43t1. At the contact 38t1 a point in the starting circuit is opened for relay A1, and contacts 33t1 and 44t1 are opened in the starting circuit. In order to bring about a connection with another branch station in the plant, the calling person actuates the dial at his station after transmitting his call signal. At the first interruption of the loop at the calling station, the relays A1 and B1 drop, and they are switched off during the entire duration of the connection. The test circuit is maintained, after the opening the contact 53b1, over contact 52a1. In a well-known manner, through the regulation of a line selector, the desired party is then switched on and called.

If the person or station called does not respond, and if the calling person wishes to reach the called person through a personnel call, the calling person puts his receiver down on the hook of his station to break the connection which he had made. The calling person then again removes the receiver, which causes the processes already described to take place, including the provision of holding current for the relays A1 and B1 over the now closed station circuit or loop. With the circuit in this condition, and after he has transmitted the call signal of the person desired, the calling party actuates the ground key TT. This causes the current circuit for the relay A1 to be maintained through contact 31a1 and resistance Wi3, and also causes the short circuiting of the winding II of relay B1.

Even after the release of the key TT, the relay B1 stays in dropped position and relay A1 is energized by the following circuit: negative, resistance Wi3, contact 31a1, winding I of relay A1, the calling party loop, contacts 46b1, 47a1, ground. Since the two contacts 52a1 and 53b1 are opened, the above-indicated test circuit is interrupted, so that the call finder AS is released and is ready for a succeeding operation. The relay SN is then energized through the following circuit: negative, contacts 51a1, a2, a3 (these are contacts of relays of other branch stations corresponding to A1), contact 48b1, the winding of relay SN, ground. Relay SN is energized for the duration of the search connection by a holding circuit including contact 49sn. Contacts 56sn and 57sn of relay SN connect the calling party to the coupling device U. The ground connection at the contact 55sn prevents the testing of the line selector LW on the party connection.

The amplifier of the loud speaker assembly (not shown) has, at the same time, been connected to the output of the multiple-coupling device through the contact 58sn. The calling party can thus ask, over the loud speaker system, the called party to report. The called party can report by using an appropriate telephone branch station, first transmitting the correct person call number whereby the line selector LW is suitably energized. In the test circuit of the called station, there is a working contact 61sn of the loud speaker relay which connects line *c* to negative potential through resistance Wi4. Connection of the line selectors to the finder connections is thus possible only so long as the calling party, after calling, waits for the reporting of the called party. On the other hand, this prevents a personnel search from proceeding from a branch station or party point not having a ground key.

After the line selectors have been connected to the finder connection, a circuit for relay D is closed by switching arms *a* and *b* of the line selector, and the reporting party or parties are connected to the multiple coupling device U through the contacts 62d and 63d. Contact 59d may be opened, so that the amplifier and thus the loud speaker assembly is switched off, so that a private conversation can now take place between the calling party and the called parties. Such closed telephone line is as follows: the called station, switching arms *a* and *b* of the call finder AS, switching arms of the line selector LW, contacts 62d, 63d, condensers Co3, Co4, Co5, Co6, contacts 56sn, 57sn and the calling party station. The feed current for such circuit is taken from the line selector or the potentials lying at the branch line of the calling party. After the telephone conversation has been concluded, and the calling party has hung up his receiver, the relay A1 drops, causing the dropping of the relay SN. Contact 61sn is thus caused to open, thereby releasing all the connecting circuits and re-establishing them in condition for their next personnel calling operation.

Although for purposes of illustration, I have shown two preferred embodiments of combined telephone and public address systems in accordance with the invention, it is to be understood that such embodiments are illustrative only and that the invention is to be defined by the scope of the claims appended hereto.

What I claim and desire to secure by Letters Patent is:

1. A combined telephone and public address system comprising, a plurality of telephone stations for initiating and receiving telephone calls, a telephone transmission line, a selector connection assembly between each station and the transmission line, means at each station for transmitting a personal code signal from the station to any selected one of the other stations, a loud speaker system, switching means at each station for selectively and alternatively connecting the branch line of the calling station to the loud speaker system or to the transmission line, selectively operable control means at each station for operating the switching means to connect the calling station to the loud speaker system when only the control means at the calling station is operated and to disconnect the calling station from the loud speaker system when any one such control means in addition to that at the calling station is operated.

2. A combined telephone and public address system, comprising a plurality of telephone stations for initiating and receiving telephone calls each having a branch line, a telephone transmission line, a dial-operated selective connection assembly between the branch line of each station and the transmission line, a loud speaker system, switching means at each station for selectively and alternatively connecting its branch line to the loud speaker system and to the transmission line, means at each station to operate its switching means, and means operable after the transmission of a personal code signal to another called station through said dial-operated assembly to disconnect the loud speaker system from the branch line of the calling station and to connect the calling station to the called station through the dial-operated connection assembly.

3. A combined telephone and public address system comprising, a plurality of telephone stations for initiating and receiving telephone calls, a telephone transmission circuit, a loud-speaker system, switching means in the telephone circuit for selectively connecting a station from which a call is being initiated to the loud-speaker system through the telephone circuit thereby to provide for voice paging of a party being called and for disconnecting the loud-speaker system from the telephone circuit subsequent to its connection thereto, means operable in a given sequence at each station for initiating a communication connection through said telephone circuit and for selectively actuating said switching means to connect the telephone circuit to the loud-speaker system when a station is the calling station and for actuating the switching means to disconnect the loud-speaker system when a station is the called station, whereby loud-speaker communication is possible and telephonic communication between stations is possible after transmission through said speaker system without transmission of a voice output on said loud-speaker system.

4. A combined telephone and public address system comprising, a plurality of telephone stations for initiating and receiving telephone calls, a telephone transmission circuit, means at at least one station for transmitting a code call signal through said telephone circuit form the station to any selected one of the other circuits, a loud-speaker system, switching means in the telephone circuit for selectively connecting a station from which a call is being initiated to the loud-speaker system through the telephone circuit thereby to provide for voice paging of a party being called and for disconnecting the loud-speaker system from the telephone circuit subsequent to its connection thereto, means operable in a given sequence at each station for initiating a communication connection through said telephone circuit and for selectively actuating said switching means to connect the telephone circuit to the loud-speaker system when a station is the calling station and for actuating the switching means to disconnect the loud-speaker system when a station is the called station, whereby loud-speaker communication is possible and telephonic communication between stations is possible after transmission through said speaker system without transmission of a voice output on said loud-speaker system.

References Cited in the file of this patent

UNITED STATES PATENTS

| | | |
|---|---|---|
| 1,586,554 | Goodrum | June 1, 1926 |
| 2,584,210 | Kessler | Feb. 5, 1952 |
| 2,684,406 | Lomax et al. | July 20, 1954 |
| 2,722,566 | Peterson | Nov. 1, 1955 |